United States Patent
Kato

(10) Patent No.: US 7,426,428 B2
(45) Date of Patent: Sep. 16, 2008

(54) STEERING APPARATUS FOR VEHICLE AND METHOD FOR CONTROLLING THE SAME

(75) Inventor: Hiroaki Kato, Hekinan (JP)

(73) Assignee: Toyoda Koki Kabushiki Kaisha, Kariya-shi (JP)

( * ) Notice: Subject to any disclaimer, the term of this patent is extended or adjusted under 35 U.S.C. 154(b) by 701 days.

(21) Appl. No.: 11/052,087

(22) Filed: Feb. 8, 2005

(65) Prior Publication Data

US 2005/0209751 A1    Sep. 22, 2005

(30) Foreign Application Priority Data

Mar. 16, 2004    (JP) ............................. 2004-074989

(51) Int. Cl.
*B62D 5/04* (2006.01)
*B62D 6/00* (2006.01)

(52) U.S. Cl. ........................ 701/41; 701/91; 180/6.44; 180/443

(58) Field of Classification Search ................ 180/6.44, 180/422, 428; 701/42, 91
See application file for complete search history.

(56) References Cited

U.S. PATENT DOCUMENTS

2001/0027893 A1    10/2001    Nishizaki et al.
2002/0007239 A1    1/2002    Matsumoto et al.

FOREIGN PATENT DOCUMENTS

EP    1 097 855 A2    5/2001
JP    2002-254964    9/2002

*Primary Examiner*—Thomas G. Black
*Assistant Examiner*—Lin B Olsen
(74) *Attorney, Agent, or Firm*—Oblon, Spivak, McClelland, Maier & Neustadt, P.C.

(57) ABSTRACT

A vehicle steering apparatus includes a drive unit for changing a steering angle of a steered wheel. A calculation unit calculates a control target amount of the steering angle based on a vehicle model. A control unit controls the drive unit to change the steering angle based on the control target amount. A determination unit determines whether the absolute value of at least one of yaw rate of the vehicle and lateral acceleration of the vehicle is greater than or equal to a predetermined value when velocity of the vehicle is less than or equal to a predetermined velocity. The control unit refrains from executing the control based on the control target amount when the absolute value is not greater than or equal to the predetermined value.

11 Claims, 10 Drawing Sheets

STEERING APPARATUS FOR VEHICLE AND METHOD FOR CONTROLLING THE SAME

CROSS-REFERENCE TO RELATED APPLICATIONS

This application is based upon and claims the benefit of priority from prior Japanese Patent Application No. 2004-74989, filed on Mar. 16, 2004, the entire contents of which are incorporated herein by reference.

BACKGROUND OF THE INVENTION

The present invention relates to a steering apparatus for a vehicle and a method for controlling the same.

A steering control system, which controls the yaw moment of a vehicle by controlling the steering angle of steered wheels based on a vehicle model (vehicle motion model), has been proposed in recent years (refer to, for example, Japanese Laid-Open Patent Publication No. 2002-254964). The vehicle model is generated by modeling the relationship between vehicle state parameters, such as vehicle velocity and yaw rate, and motion states of the vehicle. An intelligent front steering (IFS) system is one example of such a steering control system.

The IFS system integrally executes electronic control associated with steered wheels, such as variable gear ratio control and power assist control, based on a plurality of vehicle state parameters. The variable gear ratio control changes the transmission ratio (gear ratio) of the steered wheels with respect to the steering angle (steering angle) of the steering wheel. The power assist control applies an assist force to the steering system of the vehicle.

For example, the IFS system calculates target values (e.g., a target yaw rate) of vehicle-condition parameters based on the vehicle model. Based on the target values, the system determines the steering characteristic of the vehicle and calculates a control amount for the steered wheels. When the vehicle is in an understeer state, the system executes such control that reduces the turning angle of each steered wheel (understeer control). When the vehicle is in an oversteer state, the system executes such control that steers each steered wheel at an angle in a direction opposite the direction of the yaw moment, that is, executes control that for counter-steering (oversteer control). This stabilizes the trajectory of the vehicle even under conditions where the trajectory of the vehicle is likely to become unstable, such as on a low-friction road.

However, errors in the vehicle model calculation may often occur when the vehicle velocity is very low (e.g., 5 km/h and lower). Thus, excessive control tends to occur in such a low vehicle velocity range. Such excessive control may cause the vehicle to sway even though it is traveling straight in a normal state. Accordingly, in the low vehicle velocity range, the control of the steering angle of the steered wheels based on the vehicle model, such as the oversteer control and understeer control, are not executed in the prior art.

Under some conditions, however, the trajectory of the vehicle may become unstable when the vehicle velocity is extremely low. For example, when oversteer control is being executed to stabilize the trajectory of the vehicle, the control may be ended due to decrease in the velocity of the vehicle. Improvements should be made with respect to this point.

SUMMARY OF THE INVENTION

It is an object of the present invention to provide a steering apparatus for a vehicle that stabilizes the trajectory of a vehicle irrespective of the vehicle velocity. The present invention also provides a method for controlling a steering apparatus for a vehicle.

One aspect of the present invention is a steering apparatus for use in a vehicle, in which the steering apparatus includes a steering transmission system for transmitting rotation of a steering wheel to a steered wheel. The steering apparatus includes a drive unit arrangable in the steering transmission system for changing a steering angle of the steered wheel. A calculation unit calculates a control target amount of the steering angle based on a vehicle model. A control unit controls the drive unit to change the steering angle based on the control target amount. A determination unit determines whether or not the absolute value of at least one of yaw rate of the vehicle and lateral acceleration of the vehicle is greater than or equal to a predetermined value when velocity of the vehicle is less than or equal to a predetermined velocity. The control unit refrains from executing the control based on the control target amount when the absolute value is not greater than or equal to the predetermined value.

Another aspect of the present invention is a steering apparatus for use in a vehicle, in which the steering apparatus includes a steering transmission system for transmitting rotation of a steering wheel to a steered wheel. The steering apparatus includes a drive unit arrangable in the steering transmission system for changing a steering angle of the steered wheel. A calculation unit calculates a control target amount of the steering angle based on a vehicle model. A control unit controls the drive unit to change the steering angle based on the control target amount. A gain calculation unit calculates a correction gain that reduces the control target amount based on at least one of yaw rate of the vehicle and lateral acceleration of the vehicle. A correction unit corrects the control target amount based on the correction gain. The control unit controls the drive unit to change the steering angle based on the control target amount that has been corrected when velocity of the vehicle is less than or equal to a predetermined velocity.

A further aspect of the present invention is a method for controlling steering of a steered wheel of a vehicle. The method includes calculating a control target amount for a steering angle of the steered wheel based on a vehicle model, controlling the steering angle based on the control target amount, determining whether or not the absolute value of at least one of yaw rate of the vehicle and lateral acceleration of the vehicle is greater than or equal to a predetermined value when velocity of the vehicle is less than or equal to a predetermined velocity, and refraining from controlling the steering angle based on the control target amount when the absolute value is not greater than or equal to the predetermined value.

Another aspect of the present invention is a method for controlling steering of a steered wheel of a vehicle. The method includes calculating a control target amount for a steering angle of the steered wheel based on a vehicle model, controlling the steering angle based on the control target amount, calculating a correction gain for reducing the control target amount based on at least one of yaw rate of the vehicle and lateral acceleration of the vehicle, correcting the control target amount based on the correction gain, and controlling the steering angle based on the control target amount that has been corrected when velocity of the vehicle is less than or equal to a predetermined velocity.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
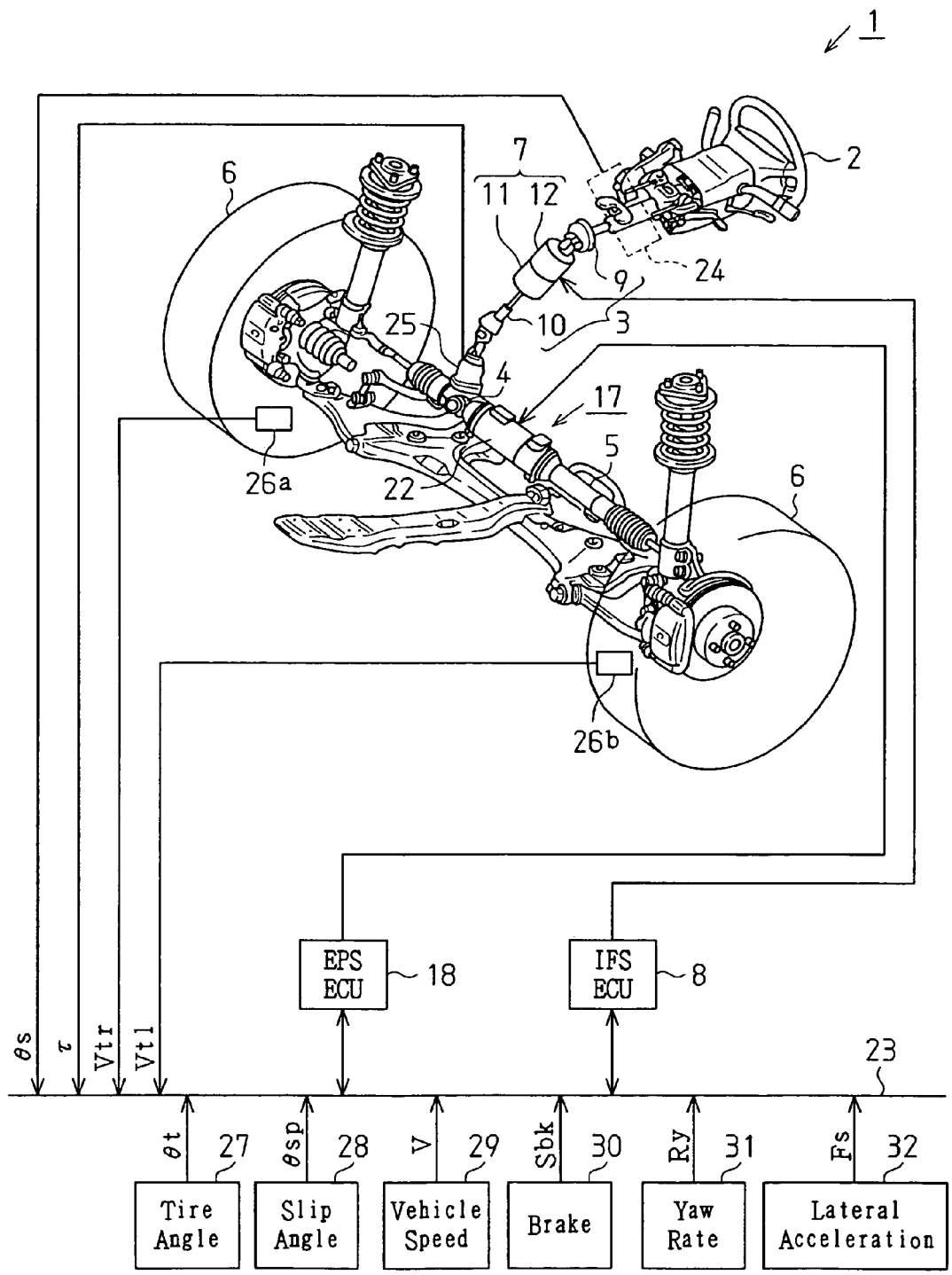
FIG. 1 is a schematic diagram showing the structure of a steering apparatus according to a first embodiment of the present invention.

A first embodiment of the present invention will now be described. FIG. 1 is a schematic diagram showing the structure of a steering apparatus 1 for a vehicle in the first embodiment. The steering apparatus 1 includes a variable gear ratio system. As shown in the drawing, a steering shaft 3, on which a steering wheel 2 is fixed, is linked to a rack 5 by a rack-and-pinion mechanism 4. The rack-and-pinion mechanism 4 converts the rotation of the steering shaft 3, which is produced through a steering operation, into a linear reciprocating motion of the rack 5. The linear reciprocating motion of the rack 5 varies the steering angle, or tire angle, of each steered wheel 6 to change the traveling direction of the vehicle.

The steering apparatus 1 of the first embodiment includes a variable gear ratio actuator 7 and a first ECU 8 (IFS ECU). The variable gear ratio actuator 7 functions as a variable transmission ratio apparatus that varies the transmission ratio (gear ratio) of the steered wheels 6 with respect to the steering angle of the steering wheel 2. The first ECU 8 controls actuation of the variable gear ratio actuator 7. In the first embodiment, the variable gear ratio actuator 7 functions as a driving unit, and the first ECU 8 functions as a control unit.

In detail, the steering shaft 3 includes a first shaft 9 and a second shaft 10. The steering wheel 2 is linked to the first shaft 9. The second shaft 10 is linked to the rack-and-pinion mechanism 4. The variable gear ratio actuator 7 includes a differential mechanism 11 and a motor 12. The differential mechanism 11 links the first shaft 9 and the second shaft 10. The motor 12 drives the differential mechanism 11. The variable gear ratio actuator 7 transmits rotation of the first shaft 9, which is produced by the steering operation and additionally by the motor 12, to the second shaft 10. In this way, the variable gear ratio actuator 7 accelerates (or decelerates) the rotation of the steering shaft 3 that is input into the rack-and-pinion mechanism 4.

Figure 2:
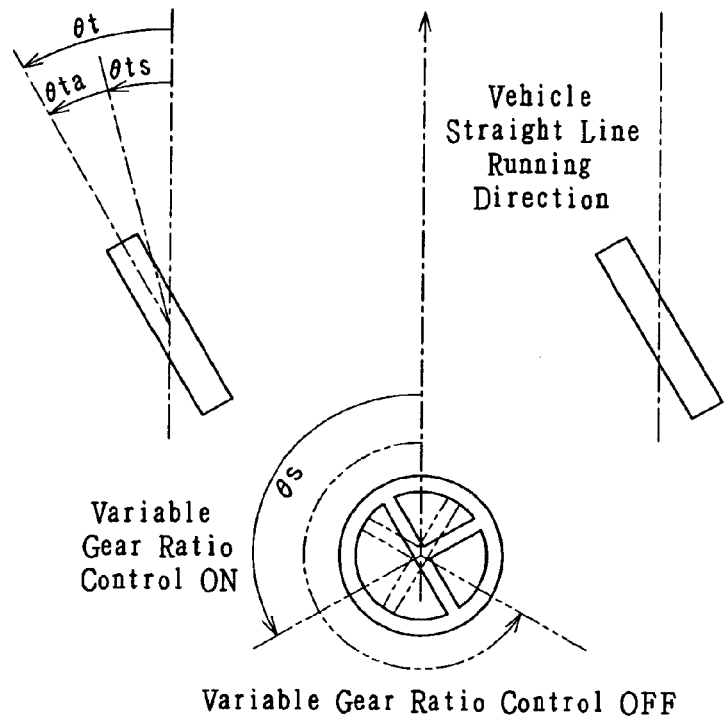
FIG. 2 is an explanatory diagram of variable gear ratio control executed in the steering apparatus of FIG. 1.
Figure 3:
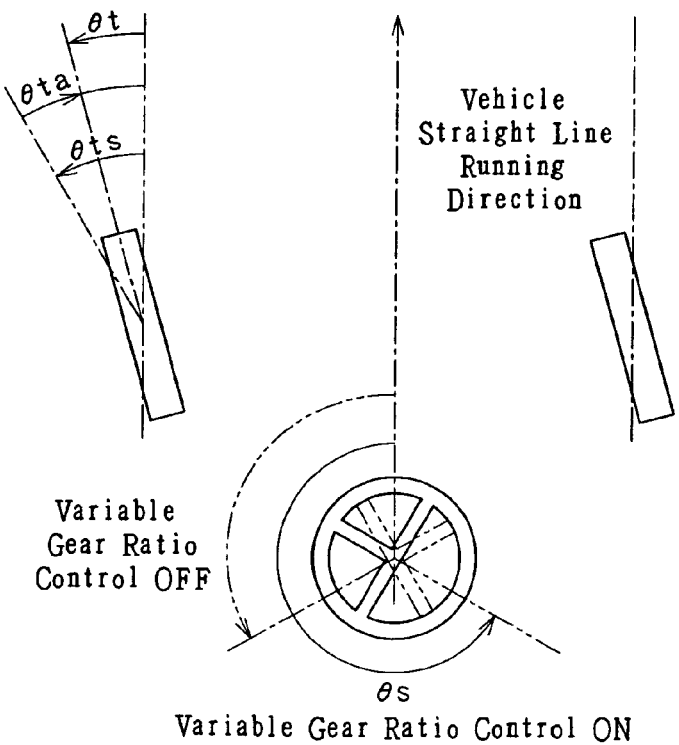
FIG. 3 is an explanatory diagram of the variable gear ratio control executed in the steering apparatus of FIG. 1.

Referring to FIGS. 2 and 3, the variable gear ratio actuator 7 adds a steering angle for the steered wheel 6 produced by motor drive (ACT angle θta) to a steering angle of the steered wheel 6 produced by the steering operation (steering angle θts). In this way, the variable gear ratio actuator 7 varies the gear ratio of the steered wheel 6 with respect to a steering angle θs. The first ECU 8 controls the variable gear ratio actuator 7 by controlling actuation of the motor 12. Thus, the first ECU 8 varies the gear ratio by controlling the ACT angle θta (variable gear ratio control).

In this case, "adding" also includes subtracting. When expressing the gear ratio of the steered wheel 6 with respect to the steering angle θs with an overall gear ratio (θs/θt, where θt is a tire angle), the overall gear ratio is small when the ACT angle θta in the same direction as the steering angle θts is added (refer to FIG. 2 in which the tire angle θt is large). The overall gear ratio is large when the ACT angle θta in the opposite direction is added to the steering angle θts (refer to FIG. 3 in which the tire angle θt is small). In the first embodiment, the steering angle θts corresponds to a first steering angle, and the ACT angle θta corresponds to a second steering angle.

As shown in FIG. 1, the steering apparatus 1 includes an electric power steering (EPS) actuator 17 and a second ECU 18 (EPS ECU). The EPS actuator 17 applies an assist force to the steering system to assist the steering operation performed by the driver. The second ECU 18 controls operation of the EPS actuator 17.

The EPS actuator 17 in the first embodiment is a rack-type EPS actuator, in which a motor 22 and the rack 5 are arranged coaxially. The motor 22 is a driving source of the EPS actuator 17. An assist torque generated by the motor 22 is transmitted to the rack 5 via a ball feed mechanism (not shown). The second ECU 18 controls the assist torque generated by the motor 22 to control the assist force applied to the steering system (power assist control).

In the first embodiment, the first ECU 8 for controlling the variable gear ratio actuator 7 and the second ECU 18 for controlling the EPS actuator 17 are connected to each other via an in-vehicle network 23, or controller area network (CAN). A plurality of sensors for detecting vehicle-condition parameters are connected to the in-vehicle network 23. More specifically, a steering angle sensor 24, a torque sensor 25, wheel velocity sensors 26a and 26b, a tire angle sensor 27, a slip angle sensor 28, a vehicle velocity sensor 29, a brake sensor 30, a yaw rate sensor 31, and a lateral acceleration (lateral G-force) sensor 32 are connected to the in-vehicle network 23. A plurality of vehicle-condition parameters detected by these sensors, namely, a steering angle θs, a steering torque τ, wheel velocities Vtr and Vtl, a tire angle θt, a slip angle θsp, a vehicle velocity V, a brake signal Sbk, a yaw rate Ry, and a lateral acceleration Fs, are input into the first ECU 8 and the second ECU 18 via the in-vehicle network 23. The first ECU 8 and the second ECU 18 transmit and receive control signals by communicating with each other via the in-vehicle network 23.

The first ECU 8 and the second ECU 18 execute the variable gear ratio control and the power assist control based on the above vehicle-condition parameters and control signals, which are input via the in-vehicle network 23.

The electric structure of the steering apparatus 1 in the first embodiment and the control executed in the steering apparatus 1 will now be described.

Figure 4:
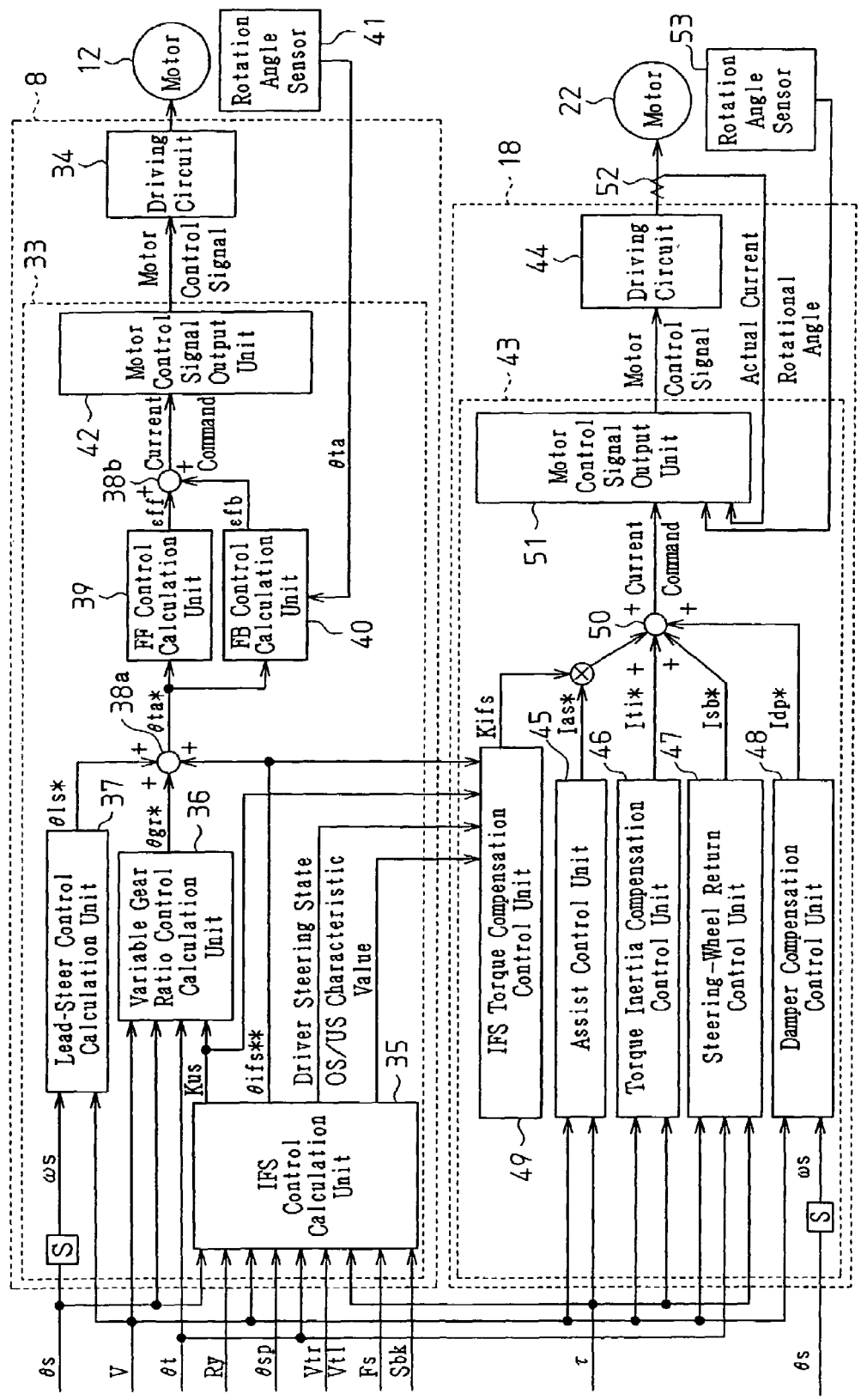
FIG. 4 is a control block diagram of the steering apparatus of FIG. 1.

FIG. 4 is a control block diagram of the steering apparatus 1 in the first embodiment. As shown in the drawing, the first ECU 8 includes a microcomputer 33 and a driving circuit 34. The microcomputer 33 outputs a motor control signal. The driving circuit 34 supplies the motor 12 with driving power based on the motor control signal.

In the first embodiment, the motors 12 and 22, which respectively function as driving sources for the variable gear ratio actuator 7 and the EPS actuator 17, are brushless motors. The driving circuit 34 and a driving circuit 44 (described later) included in the second ECU 18 supply the corresponding motors 12 and 22 with a three-phase (U, V, and W) driving power based on an input motor control signal. The control blocks described below are realized by the computer programs executed by the microcomputer 33 (43).

The microcomputer 33 includes an IFS control calculation unit 35 functioning as a calculation unit, a variable gear ratio control calculation unit 36, and a lead-steer control calculation unit 37. These control calculation units calculate control target elements of the ACT angle θta (and control signals) based on input vehicle-condition parameters.

In detail, the steering angle θs, the steering torque τ, the wheel velocities Vtr and Vtl, the tire angle θt, the slip angle θsp, the vehicle velocity V, the brake signal Sbk, the yaw rate Ry, and the lateral acceleration Fs are input into the IFS control calculation unit 35. Based on these vehicle-condition parameters, the IFS control calculation unit 35 calculates a control target element of the ACT angle θta and a control signal. More specifically, to stabilize the vehicle posture by controlling the yaw moment of the vehicle, the IFS control calculation unit 35 calculates an IFS_ACT command angle θifs**, which serves as a control target element of the ACT angle θta, and calculates during understeer (US) control a variable gear ratio gain Kus, which serves as a control signal. The IFS control calculation unit 35 also calculates a driver steering state and an OS/US characteristic value (IFS control calculation).

The vehicle posture in the yaw direction is expressed as a "steering characteristic". The steering characteristic is the characteristic relating to the difference between the turning angle of the vehicle expected by the driver and the actual turning angle of the vehicle when the driver executes a steering operation. The "turning angle of the vehicle" may also be referred to as the driving or traveling direction of the vehicle when the vehicle is in a normal turning state. The steering characteristic is referred to as "oversteer (OS)" when the actual turning angle of the vehicle is greater than the expected turning angle of the vehicle, referred to as "understeer (US)" when the actual turning angle is less than the expected turning angle, and referred to as "neutral steer (NS)" when the actual turning angle is the same as the expected turning angle. In the vehicle model, a logical value may be used as the "turning angle of the vehicle expected by the driver".

In the first embodiment, the IFS control calculation unit 35 calculates the IFS_ACT command angle θifs**, as a control target element of the ACT angle θta that positions each steered wheel 6 at a steering angle in the direction opposite the direction of the yaw moment (control target element that counter-steers), when the steering characteristic is oversteer. The IFS control calculation unit 35 calculates the variable gear ratio gain Kus during US control as a control signal that reduces the turning angle of each steered wheel 6 when the steering characteristic is understeer. The driver steering state and the OS/US characteristic value are used in internal calculation processing executed by the IFS control calculation unit 35 and are transmitted to the second ECU 18 via the in-vehicle network 23 (refer to FIG. 1). The driver steering state and the OS/US characteristic value are used in the power assist control executed by the second ECU 18.

The steering angle θs, the tire angle θt, and the vehicle velocity V, as well as the variable gear ratio gain Kus during US control calculated by the IFS control calculation unit 35, are input into the variable gear ratio control calculation unit 36. Based on these vehicle-condition parameters (and the control signal), the variable gear ratio control calculation unit 36 calculates a variable gear ratio ACT command angle θgr* as a control target element that changes the gear ratio according to the vehicle velocity V (variable gear ratio control calculation).

In the first embodiment, a variable gear ratio ACT command angle θgr* that reduces the turning angle of each steered wheel 6 is calculated based on the variable gear ratio gain Kus during US control when the steering characteristic is understeer.

The vehicle velocity V and a steering speed ωs are input into the lead-steer control calculation unit 37. The steering speed ωs is calculated by differentiating the steering angle θs (the same hereinafter). Based on the vehicle velocity V and the steering speed ωs, the lead-steer control calculation unit 37 calculates an LS_ACT command angle θls* as a control target element that improves responsiveness of the vehicle according to the steering speed (lead-steer control calculation).

The IFS control calculation unit 35, the variable gear ratio control calculation unit 36, and the lead-steer control calculation unit 37 output to an adder 38a the control target elements obtained by the calculations described above, namely, the IFS_ACT command angle θifs**, the variable gear ratio ACT command angle θgr*, and the LS_ACT command angle θls*. The adder 38a superimposes the IFS_ACT command angle θifs**, the variable gear ratio ACT command angle θgr*, and the LS_ACT command angle θls* to yield an ACT command angle θta*, which is a control target of the ACT angle θta.

The ACT command angle θta* calculated by the adder 38a is input into an FF control calculation unit 39 and an FB control calculation unit 40. The ACT angle θta, which is detected by a rotation angle sensor 41 included in the motor 12, is input into the FB control calculation unit 40. The FF control calculation unit 39 calculates a control amount εff through feedforward calculation based on the input ACT command angle θta*. The FB control calculation unit 40 calculates a control amount εfb through feedback calculation based on the ACT command angle θta* and the ACT angle θta.

The FF control calculation unit 39 and the FB control calculation unit 40 output their calculated control amounts εff and εfb to an adder 38b. The adder 38b superimposes the control amounts εff and εfb. The resulting value is input, as a current command, into a motor control signal output unit 42. The motor control signal output unit 42 generates a motor control signal based on the input current command, and outputs the motor control signal to the driving circuit 34.

Figure 5:
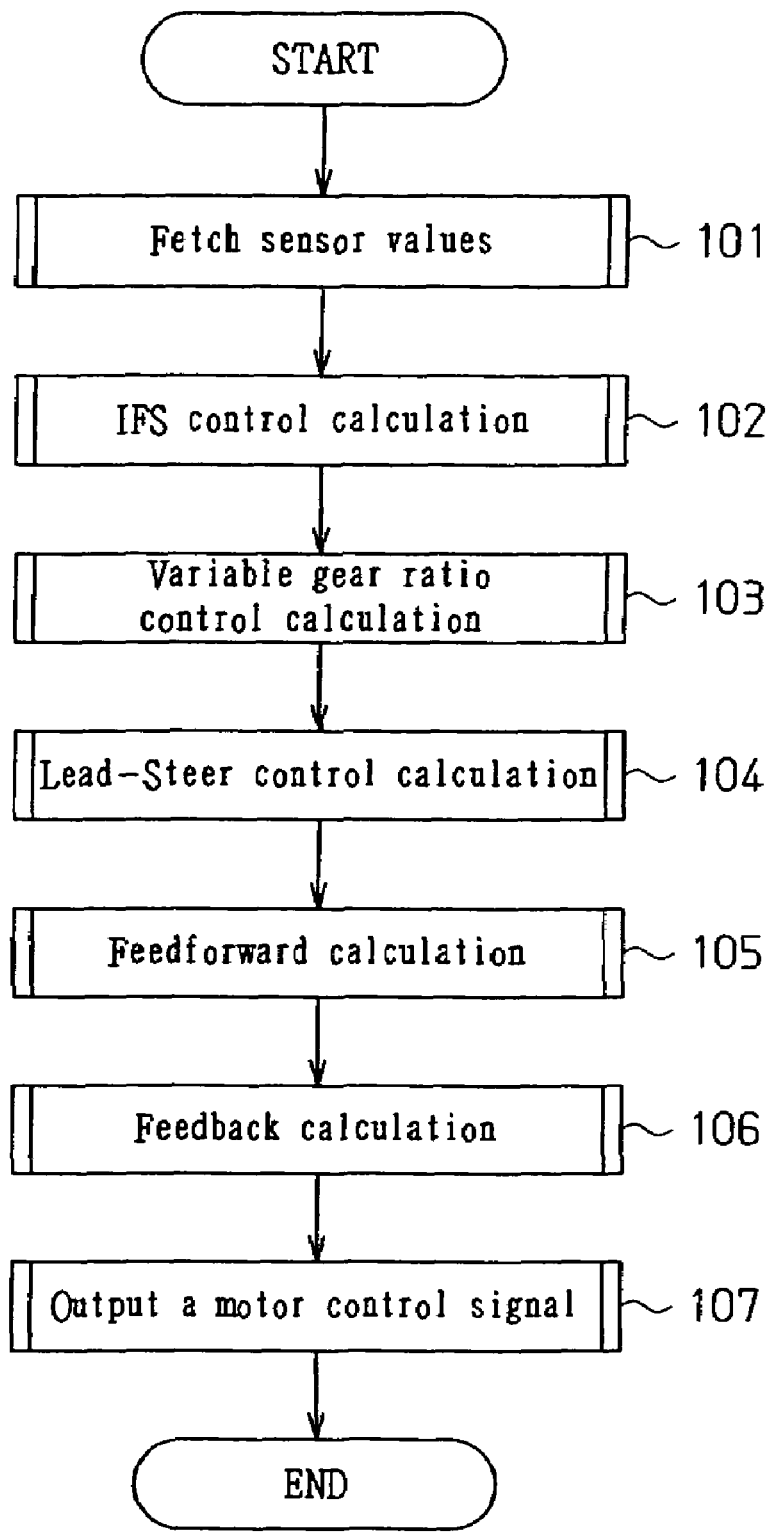
FIG. 5 is a flowchart showing a calculation process executed by a first ECU in the first embodiment.

More specifically, as shown in the flowchart of FIG. 5, the microcomputer 33 fetches sensor values from the above sensors as vehicle-condition parameters (step 101). The microcomputer 33 first executes the IFS control calculation (step 102), and then executes the variable gear ratio control calculation (step 103) and the lead-steer control calculation (step 104). The microcomputer 33 superimposes an IFS_ACT command angle θifs**, a variable gear ratio ACT command angle θgr*, and an LS_ACT command angle θls*, which are obtained by executing the calculation processing of steps 102 to 104 to calculate a control target, namely, an ACT command angle θta*.

The microcomputer 33 executes the feedforward calculation (step 105) and the feedback calculation (step 106) based on the ACT command angle θta*, to calculate a current command. The microcomputer 33 outputs a motor control signal based on the current command (step 107).

As shown in FIG. 4, like the first ECU 8, the second ECU 18 includes a microcomputer 43 and a driving circuit 44. The microcomputer 43 includes an assist control unit 45, a torque inertia compensation control unit 46, a steering-wheel return control unit 47, and a damper compensation control unit 48. These control units calculate control target elements of an assist torque generated by the motor 22 based on input vehicle-condition parameters.

In detail, the vehicle velocity V and the steering torque τ are input into each of the assist control unit 45 and the torque inertia compensation control unit 46. The assist control unit 45 calculates a basic assist current command Ias* as a control target element that serves as a basis. The torque inertia compensation control unit 46 calculates an inertia compensation current command Iti*, which is a control target element for compensating the inertia of the motor 22.

The vehicle velocity V, the steering torque τ, and the tire angle θt are input into the steering-wheel return control unit 47. The vehicle velocity V and the steering speed ωs are input into the damper compensation control unit 48. The steering-wheel return control unit 47 calculates a steering-wheel return current command Isb*, which is a control target element for improving the return characteristic of the steering wheel 2. The damper compensation control unit 48 calculates a damper compensation current command Idp*, which is a control target element for improving the power assist characteristic of the vehicle when traveling at high velocities.

The microcomputer 43 further includes an IFS torque compensation control unit 49. The IFS_ACT command angle θifs, the variable gear ratio gain Kus during US control, the driver steering state, and the OS/US characteristic value, which are calculated by the IFS control calculation unit 35, are input into the IFS torque compensation control unit 49. Based on the IFS_ACT command angle θifs, the variable gear ratio gain Kus during US control, the driver steering state, and the OS/US characteristic value, the IFS torque compensation control unit 49 calculates an IFS torque compensation gain Kifs for improving steering feel during IFS control.

The inertia compensation current command Iti*, the steering-wheel return current command Isb*, and the damper compensation current command Idp*, which are calculated by the torque inertia compensation control unit 46, the steering-wheel return control unit 47, and the damper compensation control unit 48 respectively, are input into an adder 50. The basic assist current command Ias*, which is calculated by the assist control unit 45, is multiplied by the IFS torque compensation gain Kifs, which is calculated by the IFS torque compensation control unit 49. The resulting value is then input into the adder 50. The adder 50 superimposes these control target elements to calculate a current command, which is a control target of the assist torque generated by the motor 22.

The current command yielded by the adder 50 is input into a motor control signal output unit 51. An actual current and a rotation angle, which are detected by a current sensor 52 and a rotation angle sensor 53 included in the motor 22, are input into the motor control signal output unit 51. The motor control signal output unit 51 executes feedback control based on the current command, the actual current, and the rotation angle, to generate a motor control signal. The motor control signal output unit 51 outputs the motor control signal to the driving circuit 44.

An IFS control calculation process executed by the IFS control calculation unit 35 will now be described in detail.

Figure 6:
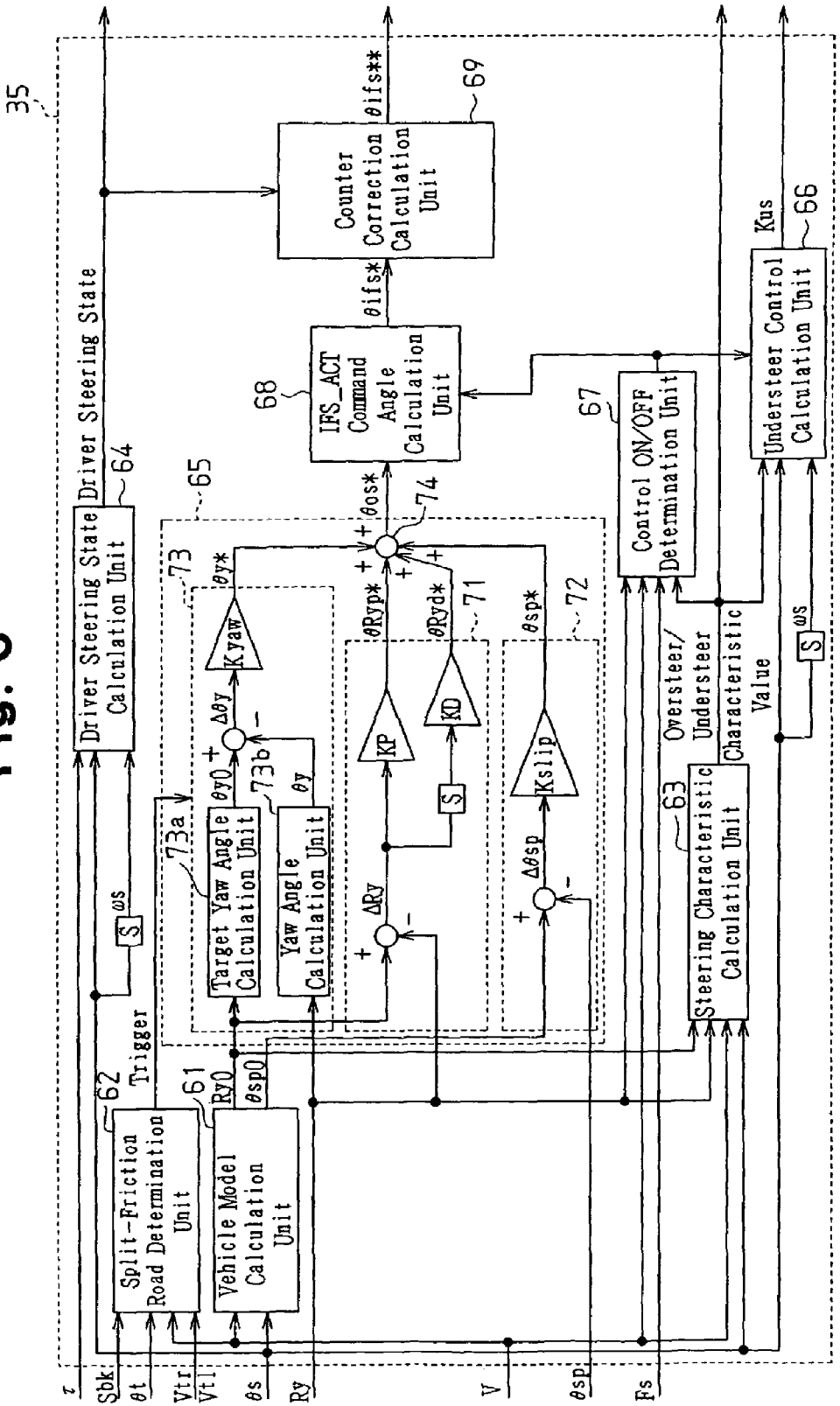
FIG. 6 is a control block diagram of an IFS control calculation unit in the first embodiment.

FIG. 6 is a control block diagram of the IFS control calculation unit 35. As shown in the drawing, the IFS control calculation unit 35 includes a vehicle model calculation unit 61, a split-friction road determination unit 62, a steering characteristic calculation unit 63, a driver steering state calculation unit 64, an OS control calculation unit 65, an US control calculation unit 66, a control ON/OFF determination unit 67, an IFS_ACT command angle calculation unit 68, and a counter correction calculation unit 69. In the first embodiment, the control ON/OFF determination unit 66 functions as a determination unit, and the steering characteristic calculation unit 63 functions as a second determination unit.

The steering angle θs and the vehicle velocity V are input into the vehicle model calculation unit 61. The vehicle model calculation unit 61 executes vehicle model calculation based on the steering angle θs and the vehicle velocity V to calculate a target yaw rate Ry0 and a target slip angle θsp0.

The vehicle model calculation executed by the vehicle model calculation unit 61 in the first embodiment, namely, the process for calculating the target yaw rate Ry0 and the target slip angle θsp0 from the steering angle θs and the vehicle velocity V based on the vehicle model is well known and disclosed, for example, in the publication cited above. Thus, the vehicle model calculation process will not be described.

The wheel velocities Vtr and Vtl, the tire angle θt, the vehicle velocity V, and the brake signal Sbk are input into the split-friction road determination unit 62. Based on these vehicle-condition parameters, the split-friction road determination unit 62 determines whether the vehicle is on a split-friction road, that is, whether right and left wheels 6 of the vehicle are respectively on two road surfaces that have completely different friction coefficients (on a split-friction surface). In detail, the split-friction road determination unit 62 determines whether the vehicle is in a braking state for a split-friction surface, or in a split-friction braking state (split-friction road determination).

The steering angle θs, the vehicle velocity V, and the yaw rate Ry, as well as the target yaw rate Ry0 calculated by the vehicle model calculation unit 61, are input into the steering characteristic calculation unit 63. Based on these vehicle-condition parameters, the steering characteristic calculation unit 63 determines the steering characteristic of the vehicle, that is, determines whether the vehicle is in an oversteer state, an understeer state, or a neutral steer state. The steering characteristic calculation unit 63 calculates an OS/US characteristic value indicating the determined steering characteristic (steering characteristic calculation).

The steering torque τ, the steering angle θs, and the steering speed ωs are input into the driver steering state calculation unit 64. Based on the steering torque τ, the steering angle θs, and the steering speed ωs, the driver steering state calculation unit 64 determines the steering state of the driver. To be specific, the driver steering state calculation unit 64 determines whether a steering operation of the driver is a cut-in operation that increases the absolute amount of the steering angle θs or a cut-back operation that decreases the absolute amount of the steering angle θs (driver steering state calculation).

The OS control calculation unit 65 includes a yaw rate FB calculation unit 71, a slip angle FB calculation unit 72, and a yaw angle FB calculation unit 73. These FB calculation units execute feedback calculation to adjust input vehicle-condition parameters to target values of the parameters.

In detail, the yaw rate Ry, and the target yaw rate Ry0 calculated by the vehicle model calculation unit 61, are input into the yaw rate FB calculation unit 71. The yaw rate FB calculation unit 71 executes feedback calculation based on a difference ΔRy between the yaw rate Ry and the target yaw rate Ry0. In detail, the yaw rate FB calculation unit 71 multiplies the difference ΔRy by a proportional FB gain KP, to yield a yaw rate proportional FB command angle θRyp*. The yaw rate FB calculation unit 71 multiples a differentiation amount of the difference ΔRy by a differentiation FB gain KD, to yield a yaw rate differentiation FB command angle θRyd* (yaw rate FB calculation).

The slip angle θsp, and the target slip angle θsp0 calculated by the vehicle model calculation unit 61, are input into the slip angle FB calculation unit 72. The slip angle FB calculation unit 72 multiplies a difference Δθsp between the slip angle θsp and the target slip angle θsp0 by a slip angle FB gain Kslip, to yield a slip angle FB command angle θsp* (slip angle FB calculation).

The target yaw rate Ry0 and the yaw rate Ry are input into the yaw angle FB calculation unit 73. The yaw angle FB calculation unit 73 includes a target yaw angle calculation unit 73a and a yaw angle calculation unit 73b. The target yaw angle calculation unit 73a and the yaw angle calculation unit 73b differentiate the target yaw rate Ry0 and the yaw rate Ry input respectively, to yield a target yaw angle θy0 and a yaw angle θy. The yaw angle FB calculation unit 73 multiplies a difference Δθy between the target yaw angle θy0 and the yaw angle θy by a yaw angle FB gain Kyaw, to yield a yaw angle FB command angle θy* (yaw angle FB calculation).

In the first embodiment, a determination result of the split-friction road determination unit 62 is input, as a trigger, into the yaw angle FB calculation unit 73. When the split-friction road determination unit 62 determines that the vehicle is not in a split-mu braking state, the yaw angle FB calculation unit 73 does not execute the yaw angle FB calculation.

The above-described control target elements of the vehicle-condition parameters, which are calculated by the yaw rate FB calculation unit 71, the slip angle FB calculation unit 72, and the yaw angle FB calculation unit 73, namely, the yaw rate proportional FB command angle θRyp*, the yaw rate differential FB command angle θRyd*, the slip angle FB command angle θsp*, and the yaw angle FB command angle θy* are input into an adder 74. The OS control calculation unit 65 superimposes these control target elements in the adder 74 to obtain an ACT command angle θos* during oversteer (OS control as a control target element of the ACT angle θta when the steering characteristic is oversteer, that is, as such a control target element that gives each steered wheel 6 a steering angle in the direction opposite the direction of the yaw moment (a control target element that counter-steers) (OS control calculation).

The steering angle θs and the steering speed ωs, as well as the OS/US characteristic value calculated by the steering characteristic calculation unit 63, are input into the US control calculation unit 66. Based on these vehicle-condition parameters, the US control calculation unit 66 calculates a variable gear ratio gain Kus during understeer control (US control calculation).

A control ON/OFF signal is input into the US control calculation unit 66 as a determination result of a control ON/OFF determination (described later) executed by the control ON/OFF determination unit 67. The US control calculation unit 66 outputs the variable gear ratio gain Kus during US control, which is obtained by the above US control calculation, when the control ON/OFF signal is a signal indicative of "US control ON". When the control ON/OFF signal input from the control ON/OFF determination unit 67 is not a signal indicative of "US control ON", the US control calculation unit 66 sets the variable gear ratio gain Kus during US control at "1" and outputs the variable gear ratio gain Kus during US control to the variable gear ratio control calculation unit 36.

In the first embodiment, the vehicle velocity V, the yaw rate Ry, and the lateral acceleration Fs, as well as the OS/US characteristic value calculated by the steering characteristic calculation unit 63, are input into the control ON/OFF determination unit 67. Based on these vehicle-condition parameters, the control ON/OFF determination unit 67 determines whether oversteer (OS) control based on the ACT command angle θos* during oversteer (OS) control, which is calculated by the OS control calculation unit 65, is to be executed, or whether understeer (US) control based on the variable gear ratio gain Kus, which is calculated by the US control calculation unit 66, is to be executed (control ON/OFF determination).

The control ON/OFF determination unit 67 outputs a determination result of the control ON/OFF determination, as a control ON/OFF signal, to the US control calculation unit 66 and the IFS_ACT command angle calculation unit 68. To be specific, the control ON/OFF determination unit 67 outputs, as the control ON/OFF signal, a signal indicative of "OS control ON" meaning that OS control is to be executed, a signal indicative of "US control ON" meaning that US control is to be executed, or a signal indicative of "control OFF" meaning that neither OS control nor US control is to be executed.

The control ON/OFF signal described above and the ACT command angle θos* during OS control calculated by the OS control calculation unit 65 are input into the IFS_ACT command angle calculation unit 68. Based on the ACT command angle θos* during OS control and the control ON/OFF signal, the IFS_ACT command angle calculation unit 68 calculates an IFS_ACT command angle θifs* (IFS_ACT command angle calculation).

To be specific, the IFS_ACT command angle calculation unit 68 sets the ACT command angle θos* during OS control as the IFS_ACT command angle θifs* when the input control ON/OFF signal is a signal indicative of "OS control ON", and sets the IFS_ACT command angle θifs* at "0" when the control ON/OFF signal is not a signal indicative of "OS control ON".

The IFS_ACT command angle θifs* and the driver steering state, which is calculated by the driver steering state calculation unit 64, are input into the counter correction calculation unit 69. The counter correction calculation unit 69 executes calculation to correct the IFS_ACT command angle θifs* based on the input driver steering state. The counter correction calculation unit 69 outputs the resulting value as an IFS_ACT command angle θifs (counter correction calculation). In the first embodiment, the steering state of the driver described above is input as a counter correction gain. In the counter correction calculation, the counter correction calculation unit 69** multiplies the IFS_ACT command angle θifs* by the counter correction gain to calculate the IFS_ACT command angle θifs**.

The IFS control calculation unit 35 executes the IFS control calculation by the above-described calculation units (determination units) executing the calculation processing (determination processing) described below.

Figure 7:
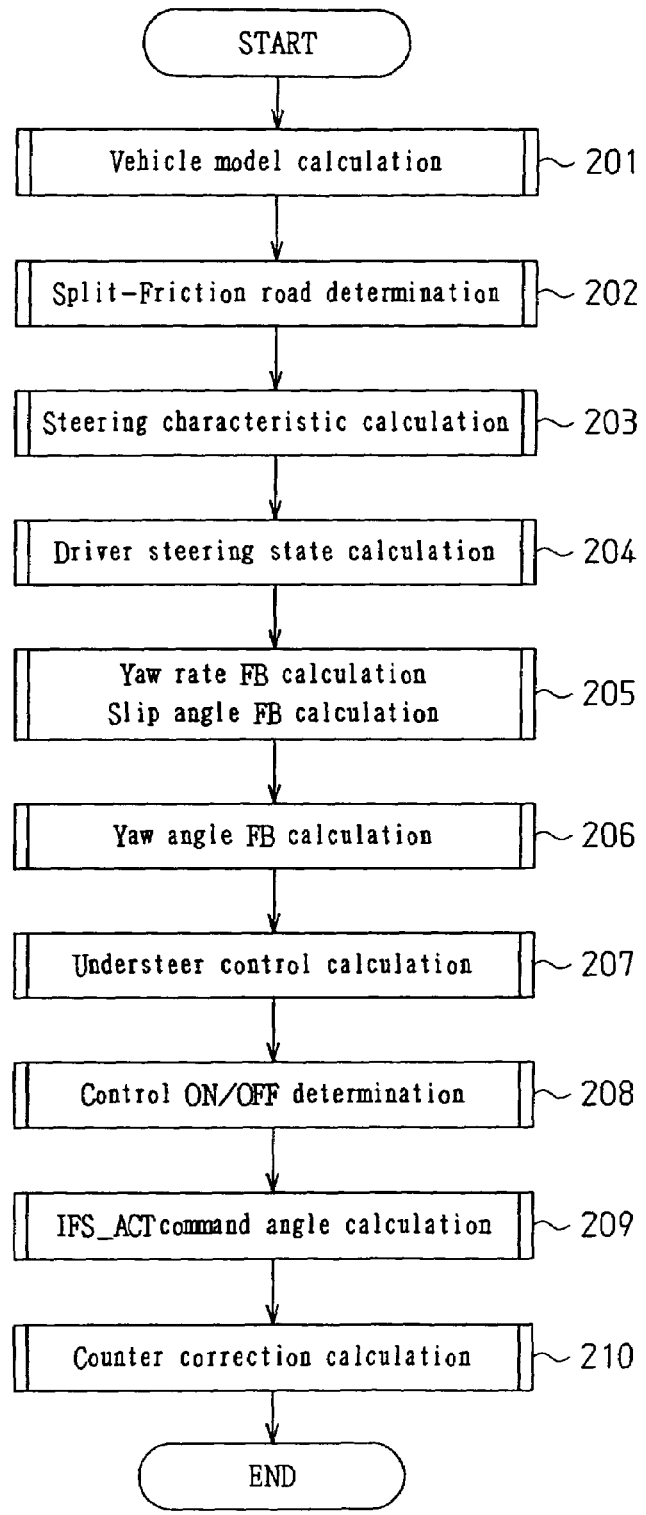
FIG. 7 is a flowchart showing an IFS control calculation process in the first embodiment.

To be specific, as shown in the flowchart of FIG. 7, the IFS control calculation unit 35 first executes the vehicle model calculation (step 201) and then executes the split-friction road determination (step 202). The IFS control calculation unit 35 subsequently executes the steering characteristic calculation (step 203) and then executes the driver steering state calculation (step 204).

Next, the IFS control calculation unit 35 executes the yaw rate FB calculation and the slip angle FB calculation based on a target yaw rate Ry0 and a target slip angle θsp0 calculated in the vehicle model calculation in step 201 described above (step 205). Using the determination result of the split-friction road determination in step 202 as a trigger, the IFS control calculation unit 35 executes the yaw angle FB calculation (step 206).

The IFS control calculation unit 35 calculates control target elements corresponding to the vehicle-condition parameters by the above-described FB calculations in steps 205 and 206. The IFS control calculation unit 35 superimposes the control target elements to yield an ACT command angle θos* during OS control as a control target element of the ACT angle θta, which serves as a basis for OS control.

Next, the IFS control calculation unit 35 executes the US control calculation (step 207), and then executes the control ON/OFF determination (step 208). Based on the determination result in step 208, the IFS control calculation unit 35 executes the IFS_ACT command angle calculation to calculate an IFS_ACT command angle θifs* as a control target element of the ACT angle θta for OS control (step 209). The IFS control calculation unit 35 executes the counter correction calculation based on a driver steering state calculated in step 204 and outputs an IFS_ACT command angle θifs** (step 210).

Next, the following describes the control ON/OFF determination executed by the control ON/OFF determination unit 67 in detail.

Figure 8:
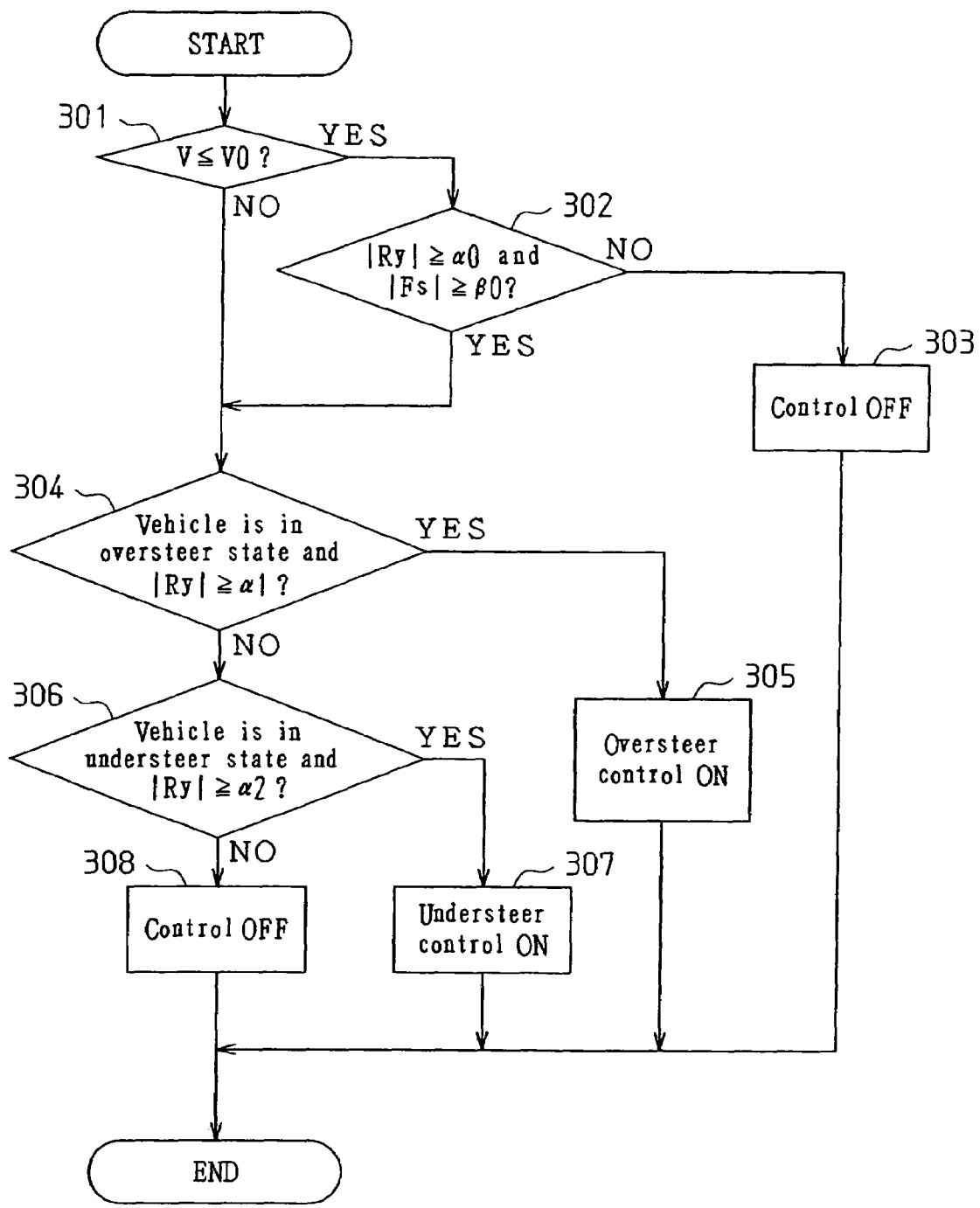
FIG. 8 is a flowchart showing a control ON/OFF determination process in the first embodiment.

FIG. 8 is a flowchart showing a control ON/OFF determination process executed by the control ON/OFF determination unit 67. As shown in the drawing, the control ON/OFF determination unit 67 first determines whether the vehicle velocity V is less than or equal to a predetermined velocity V0, which is set in advance (step 301). In the first embodiment, the predetermined velocity V0 is set at an extremely low speed (e.g., 5 km/h), namely, in such a range in which the vehicle model calculation described above tends to have a calculation error.

When determining that the vehicle velocity V is less than or equal to the predetermined velocity V0 in step 301 (step 301: Yes), the control ON/OFF determination unit 67 next determines whether the absolute value of the yaw rate Ry is greater than or equal to a predetermined value α0, which is set in advance, and the absolute value of the lateral acceleration Fs is greater than or equal to a predetermined value β0, which is set in advance (step 302). In the first embodiment, values of the yaw rate Ry and the lateral acceleration Fs, which are estimated to cause the trajectory of the vehicle to be unstable (estimated to destabilize the trajectory of the vehicle) when the vehicle velocity V is in an extremely low range, are obtained through experiments, simulations, etc. These values are set as the predetermined values α0 and β0.

When determining that the absolute value of the yaw rate Ry is not greater than or equal to the predetermined value α0 and the absolute value of the lateral acceleration Fs is not greater than or equal to the predetermined value β0 (step 302: NO), the control ON/OFF determination unit 67 determines that neither OS control nor US control described above is to be executed, that is, determines "control OFF" (step 303).

When determining that the vehicle velocity V is not less than or equal to the predetermined velocity V0 in step 301 (step 301: NO), that is, when the vehicle velocity V is not in the extremely low range, the control ON/OFF determination unit 67 executes the processing of step 304 and subsequent steps, and determines whether OS control is to be executed or whether US control is to be executed.

In the same manner, when determining that the absolute value of the yaw rate Ry is greater than or equal to the predetermined value α0 and that the absolute value of the lateral acceleration Fs is greater than or equal to the predetermined value β0 (step 302: YES), the control ON/OFF determination unit 67 executes the processing of step 304 and subsequent steps, and determines whether OS control is to be executed or whether US control is to be executed.

To be specific, in the first embodiment, when the absolute values of the yaw rate Ry and the lateral acceleration Fs are greater than or equal to the predetermined values (α0 and β0), the control ON/OFF determination unit 67 determines whether OS control is to be executed or whether US control is to be executed, even when the vehicle velocity V is less than or equal to the predetermined velocity V0.

The control ON/OFF determination unit 67 first determines whether the vehicle is in an oversteer state and the absolute value of the yaw rate Ry is greater than or equal to a predetermined value α1, which is set in advance (step 304). When determining that the vehicle is in an oversteer state and the absolute value of the yaw rate Ry is greater than or equal to the predetermined value α1 (step 304: YES), the control ON/OFF determination unit 67 determines that the vehicle is in an oversteer state where OS control is to be executed, that is, determines "OS control ON" (step 305).

When determining that the vehicle is not in an oversteer state and the absolute value of the yaw rate Ry is not greater than or equal to the predetermined value α1 in step 304 (step 304: NO), the control ON/OFF determination unit 67 next determines whether the vehicle is in an understeer state and the absolute value of the yaw rate Ry is greater than or equal to a predetermined value α2, which is set in advance (step 306). When determining that the vehicle is in an understeer state and the absolute value of the yaw rate Ry is greater than or equal to the predetermined value α2 (step 306: YES), the control ON/OFF determination unit 67 determines that the vehicle is in an understeer state where US control is to be executed, that is, determines "US control ON" (step 307).

When determining that the vehicle is not in an understeer state and the absolute value of the yaw rate Ry is not greater than or equal to the predetermined value α2 in step 306 (step 306: NO), the control ON/OFF determination unit 67 determines that neither OS control nor US control is to be executed, that is, determines "control OFF" (step 308).

The first embodiment has the advantages described below.

(1) The control ON/OFF determination unit 67 determines whether the vehicle velocity V is less than or equal to the predetermined velocity V0 (step 301). When determining that the vehicle velocity V is less than or equal to the predetermined velocity V0, the control ON/OFF determination unit 67 next determines whether the absolute value of the yaw rate Ry is greater than or equal to the predetermined value α0 and the absolute value of the lateral acceleration Fs is greater than or equal to the predetermined value β0 (step 302). When determining that the absolute value of the yaw rate Ry is not greater than or equal to the predetermined value α0 and the absolute value of the lateral acceleration Fs is not greater than or equal to the predetermined value β0 in step 302 (step 302: NO), the control ON/OFF determination unit 67 determines that neither OS control nor US control is to be executed, that is, determines "control OFF" (step 303).

With this structure, when the vehicle velocity V is less than or equal to the predetermined velocity V0, that is, when the vehicle velocity V is extremely low, OS control or US control, which is the control of the steering angle of the steered wheels 6 based on the vehicle model, is executed only when the absolute values of the yaw rate Ry and the lateral acceleration Fs are greater than or equal to the predetermined values ($\alpha 0$ and $\beta 0$), namely, only when the absolute values exceed such values that are estimated to cause the trajectory of the vehicle to be unstable. Thus, when the vehicle velocity V is in an extremely low range, neither OS control nor US control is executed while the trajectory of the vehicle is likely to be stable. This structure prevents lateral movement of the vehicle, which would be caused by calculation errors in the vehicle model calculation. While the trajectory of the vehicle is likely to be destabilized, OS control or US control is executed to stabilize the trajectory of the vehicle even when the vehicle velocity V is in an extremely low range. This structure enables the trajectory of the vehicle to be stabilized irrespective of the vehicle velocity.

A second embodiment of the present invention will now be described with reference to the drawings. A steering apparatus for a vehicle according to the second embodiment includes a variable gear ratio system. To avoid redundancy, like or same reference numerals are given to those components that are the same as the corresponding components of the first embodiment.

The hardware structure of the steering apparatus in the second embodiment is the same as that of the steering apparatus 1 in the first embodiment. The steering apparatus in the second embodiment differs from the steering apparatus 1 in the first embodiment only in a control block of the first ECU 8, specifically, only in the structure of the IFS control calculation unit.

Figure 9:
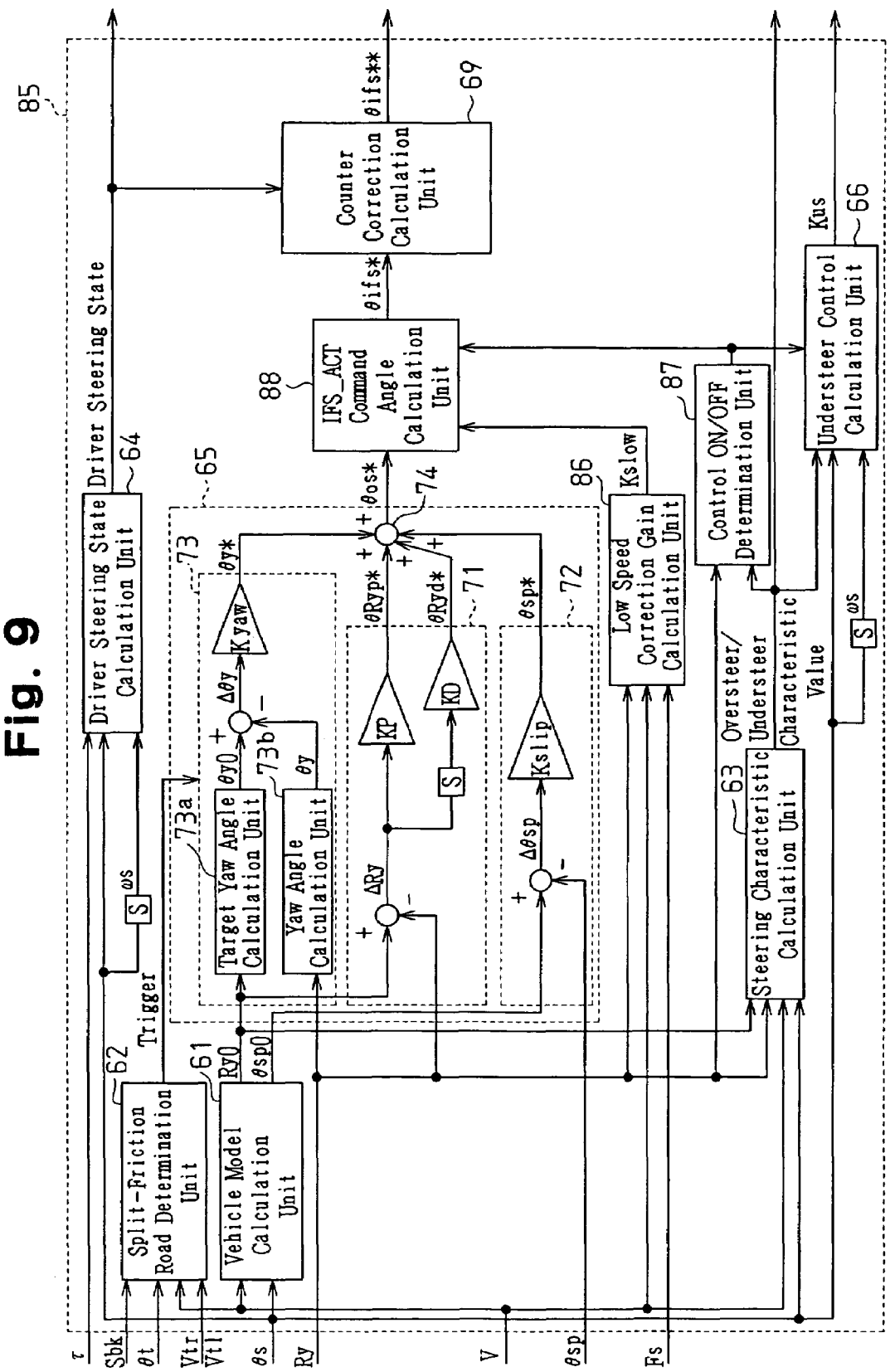
FIG. 9 is a control block diagram of an IFS control calculation unit according to a second embodiment of the present invention.

In detail, an IFS control calculation unit 85 in the second embodiment includes a low speed correction gain calculation unit 86 as shown in FIG. 9. The vehicle velocity V, the yaw rate Ry, and the lateral acceleration Fs are input into the low speed correction gain calculation unit 86. Based on the yaw rate Ry and the lateral acceleration Fs, the low speed correction gain calculation unit 86 calculates a control target element of the ACT angle $\theta$ta for OS control, namely, a low speed correction gain Kslow that reduces the IFS_ACT command angle $\theta$ifs*.

In the second embodiment, the relationship between the low speed correction gain Kslow and the yaw rate Ry and between the low speed correction gain Kslow and the lateral acceleration Fs is obtained in advance through experiments, simulations, etc., and is stored as a map in a memory (not shown). The IFS control calculation unit 85 calculates the low speed correction gain Kslow by referring to the map.

In the second embodiment, the low speed correction gain calculation unit 86 determines whether the input vehicle velocity V is less than or equal to the predetermined velocity V0. When the vehicle velocity V is less than or equal to the predetermined velocity V0, the low speed correction gain calculation unit 86 calculates the low speed correction gain Kslow in the manner as described above, and outputs the calculated low speed correction gain Kslow to an IFS_ACT command angle calculation unit 88. When the vehicle velocity V is not less than or equal to the predetermined velocity V0, the low speed correction gain calculation unit 86 sets the low speed correction gain Kslow at "1", and outputs the low speed correction gain Kslow to the IFS_ACT command angle calculation unit 88.

In the same manner as for the IFS_ACT command angle calculation unit 68 in the first embodiment, an ACT command angle $\theta$os* during OS control, which is calculated by the OS control calculation unit 65, and a control ON/OFF signal, which is a determination result of a control ON/OFF determination unit 87, are input into the IFS_ACT command angle calculation unit 88. The IFS_ACT command angle calculation unit 88 multiplies the ACT command angle $\theta$os* during OS control by the low speed correction gain Kslow to calculate an IFS_ACT command angle $\theta$ifs*. To be specific, in the second embodiment, the low speed correction gain calculation unit 86 functions as a gain calculation unit, and the IFS_ACT command angle calculation unit 88 functions as a correction means.

The control ON/OFF determination unit 87 in the second embodiment does not execute the conditional determination based on the vehicle velocity V, the yaw rate Ry, and the lateral acceleration Fs, which is executed by the control ON/OFF determination unit 67 in the first embodiment (refer to steps 301 to 303 in FIG. 8). Thus, in the second embodiment, the vehicle velocity V and the lateral acceleration Fs are not input into the control ON/OFF determination unit 87.

Figure 10:
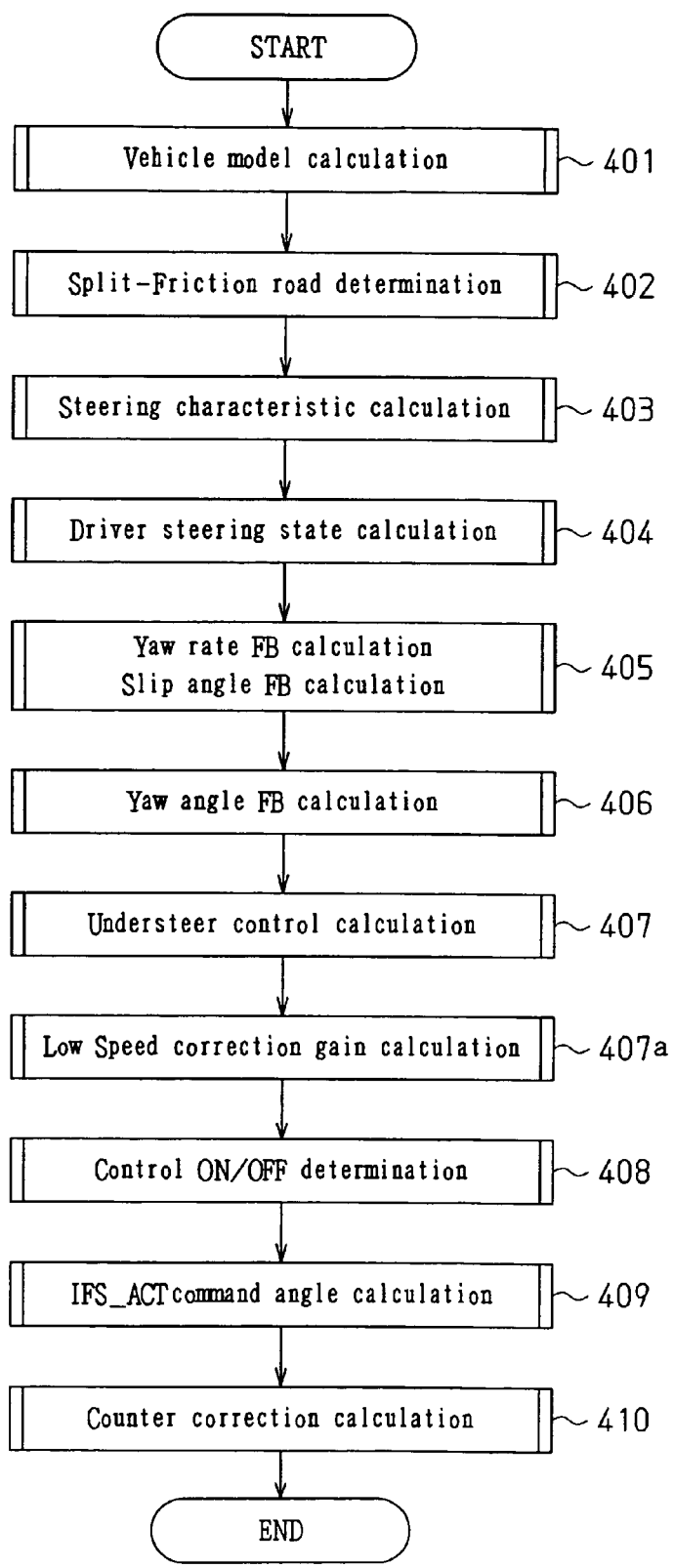
FIG. 10 is a flowchart showing an IFS control calculation process in the second embodiment.
Figure 11:
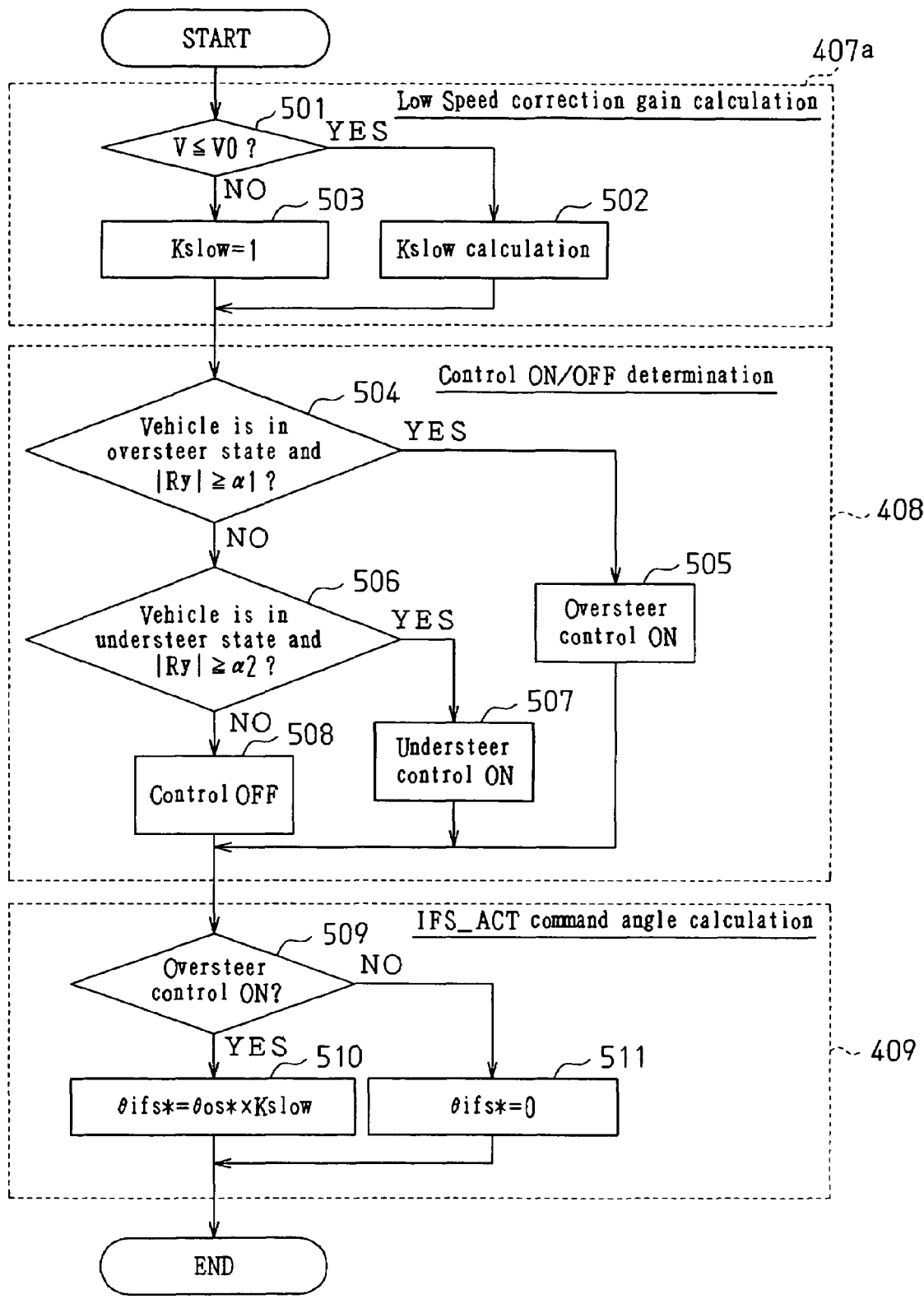
FIG. 11 is a flowchart showing the IFS control calculation process in the second embodiment.

Next, the following describes an IFS control calculation process executed by the IFS control calculation unit with the above-described structure, with reference to the flowcharts of FIGS. 10 and 11. In the flowchart of FIG. 10, the calculation processing of steps 401 to 407 and 410 is the same as the calculation processing of steps 201 to 207 and 210 in the flowchart of FIG. 7 showing the IFS control calculation process in the first embodiment and will thus not be discussed.

As shown in the flowchart of FIG. 10, the IFS control calculation unit 85 in the second embodiment executes the low speed correction gain calculation in step 407a, in addition to the calculation processing of steps 401 to 407. Based on a low speed correction gain Kslow calculated in step 407a, the IFS control calculation unit 85 executes the IFS_ACT command angle calculation in step 409, to obtain a control target element of the ACT angle $\theta$ta for OS control, that is, an IFS_ACT command angle $\theta$ifs*.

In further detail, as shown in the flowchart of FIG. 11, the IFS control calculation unit 85 first determines whether the vehicle velocity V is less than or equal to the predetermined velocity V0, which is set in advance, in the low speed correction gain calculation in step S407a (step 501). As in the first embodiment, the predetermined velocity V0 is set at an extremely low speed (e.g., 5 km/h), that is, set in such a range in which the vehicle model calculation described above tends to have a calculation error.

When determining that the vehicle velocity V is less than or equal to the predetermined velocity V0 in step 501 (step 501: YES), the IFS control calculation unit 85 calculates a low speed correction gain Kslow for reducing the IFS_ACT command angle $\theta$ifs* (step 502). When determining that the vehicle velocity V is not less than or equal to the predetermined velocity V0 (step 501: NO), the IFS control calculation unit 85 sets the low speed correction gain Kslow at "1" (step 503).

Next, the IFS control calculation unit 85 executes the control ON/OFF determination in step 408 (steps 504 to 508). As described above, the conditional determination based on the vehicle velocity V, the yaw rate Ry, and the lateral acceleration Fs is not executed in the control ON/OFF determination in the second embodiment. The processing of steps 504 to 508 is the same as the processing of steps 304 to 308 in the flowchart of FIG. 8 and will thus not be discussed.

Next, the IFS control calculation unit 85 first determines whether a determination result of the control ON/OFF determination in step 408 is "OS control ON" (step 509). When the determination result is "OS control ON" (step 509: YES), the IFS control calculation unit 85 multiplies the ACT command angle θos* during OS control by the low speed correction gain Kslow to calculate an IFS_ACT command angle θifs* (step 510). When the determination result is not "OS control ON" (step 509: NO), the IFS control calculation unit 85 sets the IFS_ACT command angle θifs* at "0" (step 511).

The second embodiment has the effects advantages described below.

(1) The IFS control calculation unit 85 includes the low speed correction gain calculation unit 86. When the vehicle velocity V is less than or equal to the predetermined velocity V0, the low speed correction gain calculation unit 86 calculates the low speed correction gain Kslow for reducing the IFS_ACT command angle θifs* based on the yaw rate Ry and the lateral acceleration Fs. The IFS_ACT command angle calculation unit 88 multiplies the ACT command angle θos* during OS control by the low speed correction gain Kslow to calculate the IFS_ACT command angle θifs*.

With this structure, the control target element of the ACT angle θta for OS control, that is, the control target element based on the vehicle model is reduced using the low speed correction gain Kslow when the vehicle velocity V is less than or equal to the predetermined velocity V0, i.e., when the vehicle velocity V is extremely low. Thus, even when the vehicle velocity V is in an extremely low range, lateral movement of the vehicle, which is caused by calculation errors in the vehicle model calculation, is prevented, and OS control is executed to stabilize the trajectory of the vehicle. This enables the trajectory of the vehicle to be stabilized irrespective of the vehicle velocity.

It should be apparent to those skilled in the art that the present invention may be embodied in many other specific forms without departing from the spirit or scope of the invention. Particularly, it should be understood that the present invention may be embodied in the following forms.

In the above embodiments, the present invention is embodied in vehicle steering apparatuses that include variable gear ratio systems. However, the present invention may be embodied in a vehicle steering apparatus using a steer-by-wire system, which does not have a mechanical link between the steering wheel 2 and steered wheels 6.

In the above embodiments, the IFS control calculation unit 35 (85) is included in the first ECU 8 for controlling the variable gear ratio actuator 7. However, the IFS control calculation unit 35 (85) may be included in the second ECU 18 for controlling the EPS actuator 17.

In the first embodiment, in the conditional determination (refer to step 302 in FIG. 8) executed when the vehicle velocity V is less than or equal to the predetermined velocity V0, the control ON/OFF determination unit 67 determines whether the absolute values of the yaw rate Ry and the lateral acceleration Fs are greater than or equal to their predetermined values (α0 and β0) set in advance. However, the present invention should not be limited to such a structure. In the conditional determination, the control ON/OFF determination unit 67 only needs to execute determination as to at least one of the yaw rate Ry and the lateral acceleration Fs. For example, the control ON/OFF determination unit 67 may execute determination as to only one of the yaw rate Ry and the lateral acceleration Fs, or may execute determination as to both the yaw rate Ry and the lateral acceleration Fs to determine whether the absolute value of at least one of the yaw rate Ry and the lateral acceleration Fs is greater than or equal to its predetermined value.

In the second embodiment, the low speed correction gain calculation unit 86 calculates the low speed correction gain Kslow based on the yaw rate Ry and the lateral acceleration Fs. However, the low speed correction gain calculation unit 86 may calculate the low speed correction gain Kslow based on at least one of the yaw rate Ry and the lateral acceleration Fs.

In the second embodiment, the low speed correction gain calculation unit 86 determines whether the vehicle velocity V is less than or equal to the predetermined velocity V0. However, the IFS_ACT command angle calculation unit 88 may execute the vehicle velocity determination described above. To be specific, the structure only needs to be such that OS control is executed based on the IFS_ACT command angle θifs* corrected using the low speed correction gain Kslow when the vehicle velocity V is less than or equal to the predetermined velocity V0.

The present examples and embodiments are to be considered as illustrative and not restrictive, and the invention is not to be limited to the details given herein, but may be modified within the scope and equivalence of the appended claims.

What is claimed is:

1. A steering apparatus for use in a vehicle, in which the steering apparatus includes a steering transmission system for transmitting rotation of a steering wheel to a steered wheel, the steering apparatus comprising:
   a drive unit arrangable in the steering transmission system for changing a steering angle of the steered wheel;
   a calculation unit for calculating a control target amount of the steering angle based on a vehicle model;
   a control unit for controlling the drive unit to change the steering angle based on the control target amount;
   a determination unit for determining whether or not the absolute value of at least one of yaw rate of the vehicle and lateral acceleration of the vehicle is greater than or equal to a predetermined value when velocity of the vehicle is less than or equal to a predetermined velocity, wherein the control unit refrains from executing the control based on the control target amount when the absolute value is not greater than or equal to the predetermined value.

2. The steering apparatus according to claim 1, wherein the control unit executes the control based on the control target amount when the absolute value is greater than or equal to the predetermined value.

3. The steering apparatus according to claim 1, further comprising:
   a second determination unit for determining a steering characteristic of the vehicle based on the vehicle model, the control unit controlling the drive unit to change the steering angle in a direction opposite the direction of a yaw moment when the steering characteristic is determined as being oversteer, and the control unit controlling the drive unit to decrease the steering angle when the steering characteristic is determined as being understeer.

4. The steering apparatus according to claim 3, wherein the control unit does not execute the control based on the second determination unit when the absolute value is greater than or equal to the predetermined value.

5. The steering apparatus according to claim 1, wherein the drive unit includes a motor, and the steering angle of the steered wheel includes a first steering angle based on rotation of the steering wheel and a second steering angle based on drive of the motor, the second steering angle being added to the first steering angle to vary a transmission ratio of the steering angle of the steered wheel relative to the rotational angle of the steering wheel.

6. A steering apparatus for use in a vehicle, in which the steering apparatus includes a steering transmission system for transmitting rotation of a steering wheel to a steered wheel, the steering apparatus comprising:

a drive unit arrangable in the steering transmission system for changing a steering angle of the steered wheel;

a calculation unit for calculating a control target amount of the steering angle based on a vehicle model;

a control unit for controlling the drive unit to change the steering angle based on the control target amount;

a gain calculation unit for calculating a correction gain that reduces the control target amount based on at least one of yaw rate of the vehicle and lateral acceleration of the vehicle; and a correction unit for correcting the control target amount based on the correction gain, wherein the control unit controls the drive unit to change the steering angle based on the control target amount that has been corrected when velocity of the vehicle is less than or equal to a predetermined velocity.

7. The steering apparatus according to claim 6, further comprising:

a determination unit for determining a steering characteristic of the vehicle based on the vehicle model, the control unit controlling the drive unit to change the steering angle in a direction opposite the direction of a yaw moment when the steering characteristic is determined as being oversteer, and the control unit controlling the drive unit to decrease the steering angle when the steering characteristic is determined as being understeer.

8. The steering apparatus according to claim 6, wherein the drive unit includes a motor, and the steering angle of the steered wheel includes a first steering angle based on rotation of the steering wheel and a second steering angle based on drive of the motor, the second steering angle being added to the first steering angle to vary a transmission ratio of the steering angle of the steered wheel relative to the rotational angle of the steering wheel.

9. A method for controlling steering of a steered wheel of a vehicle, the method comprising:

calculating a control target amount for a steering angle of the steered wheel based on a vehicle model;

controlling the steering angle based on the control target amount;

determining whether or not the absolute value of at least one of yaw rate of the vehicle and lateral acceleration of the vehicle is greater than or equal to a predetermined value when velocity of the vehicle is less than or equal to a predetermined velocity; and refraining from controlling the steering angle based on the control target amount when the absolute value is not greater than or equal to the predetermined value.

10. The method according to claim 9, further comprising controlling the steering angle based on the control target amount when the absolute value is greater than or equal to the predetermined value.

11. A-method for controlling steering of a steered wheel of a vehicle, the method comprising:

calculating a control target amount for a steering angle of the steered wheel based on a vehicle model;

controlling the steering angle based on the control target amount;

calculating a correction gain for reducing the control target amount based on at least one of yaw rate of the vehicle and lateral acceleration of the vehicle;

correcting the control target amount based on the correction gain; and controlling the steering angle based on the control target amount that has been corrected when velocity of the vehicle is less than or equal to a predetermined velocity.

* * * * *